(12) United States Patent
Lord

(10) Patent No.: US 8,092,261 B2
(45) Date of Patent: Jan. 10, 2012

(54) CONNECTOR SHAPED AS A FUNCTION OF ITS POWER RATING

(75) Inventor: Charles Lord, Scottsdale, AZ (US)

(73) Assignee: iGo, Inc., Scottsdale, AZ (US)

( * ) Notice: Subject to any disclaimer, the term of this patent is extended or adjusted under 35 U.S.C. 154(b) by 13 days.

(21) Appl. No.: 12/803,357

(22) Filed: May 4, 2010

(65) Prior Publication Data
US 2010/0273361 A1     Oct. 28, 2010

Related U.S. Application Data

(63) Continuation of application No. 10/790,877, filed on Mar. 2, 2004, now Pat. No. 6,976,885.

(51) Int. Cl.
*H01R 13/64* (2006.01)

(52) U.S. Cl. ....................................... 439/680

(58) Field of Classification Search .................. 439/680, 439/677, 678, 679, 502
See application file for complete search history.

(56) References Cited

U.S. PATENT DOCUMENTS

| | | | |
|---|---|---|---|
| 4,405,190 A | 9/1983 | Schroeder | |
| 4,647,007 A | 3/1987 | Bajka | |
| 5,030,129 A | 7/1991 | Koch | |
| 5,322,449 A | 6/1994 | Pizano | |
| 5,362,261 A * | 11/1994 | Puerner | 439/752 |
| 5,370,556 A | 12/1994 | Olsson | |
| 5,421,734 A | 6/1995 | MacWilliams | |
| 5,588,240 A | 12/1996 | Zilliox | |
| 5,684,689 A | 11/1997 | Hahn | |
| 5,899,766 A | 5/1999 | DeFeo | |
| 5,907,197 A * | 5/1999 | Faulk | 307/119 |
| 5,931,683 A | 8/1999 | Pinel | |
| 6,068,500 A | 5/2000 | Kantner | |
| 6,080,022 A | 6/2000 | Shaberman et al. | |
| 6,104,162 A * | 8/2000 | Sainsbury et al. | 320/111 |
| 6,302,744 B1 * | 10/2001 | Nomura | 439/680 |
| 6,364,697 B1 | 4/2002 | Tseng et al. | |
| 6,364,718 B1 * | 4/2002 | Polgar et al. | 439/680 |

(Continued)

FOREIGN PATENT DOCUMENTS

DE    2148803    4/1973

(Continued)

OTHER PUBLICATIONS

USPTO; Notice of Allowance dated Sep. 27, 2005 in U.S. Appl. No. 10/790,877.

(Continued)

*Primary Examiner* — Chandrika Prasad
(74) *Attorney, Agent, or Firm* — Snell & Wilmer L.L.P.

(57) ABSTRACT

A keyed power source connector and keyed device connector that are backwards compatible, ensuring that the power rated device connectors can only mate with power source connectors power rated at or above the device connector power rating. One connector is formed as a plug, and the other connector is formed as a socket. The connectors have are shaped having a profile that is a function of the respective connector power rating. A keyed portion of the power source connector plug will physically interfere with and not be receivable within a device connector socket when the device connector power rating exceeds the power source connector power rating. This connector system ensures target portable electronic devices coupled to the device connector can not draw power exceeding the rating of the power source connector.

15 Claims, 6 Drawing Sheets

U.S. PATENT DOCUMENTS

| | | | |
|---|---|---|---|
| 6,461,181 B1 | 10/2002 | Goh et al. | |
| 6,540,549 B2 * | 4/2003 | Rupert | 439/502 |
| 6,544,049 B1 | 4/2003 | Pierson, Jr. | |
| 6,746,279 B1 | 6/2004 | Lopez | |
| 6,796,843 B1 | 9/2004 | Ryan et al. | |
| 6,883,718 B1 | 4/2005 | Le et al. | |
| 7,021,971 B2 | 4/2006 | Chou et al. | |
| 2004/0018774 A1 | 1/2004 | Long et al. | |

FOREIGN PATENT DOCUMENTS

| | | |
|---|---|---|
| GB | 345492 | 3/1931 |
| GB | 516006 | 12/1939 |

OTHER PUBLICATIONS

USPTO; Office Action dated Apr. 7, 2005 in U.S. Appl. No. 10/790,877.
USPTO; Notice of Allowance dated Oct. 10, 2006 in U.S. Appl. No. 11/300,064.
USPTO; Office Action dated Mar. 2, 2006 in U.S. Appl. No. 11/300,064.
USPTO; Notice of Allowance dated Feb. 12, 2007 in U.S. Appl. No. 11/524,705.
Mobilecore/Formosa Power System and Tips—Brochure; Nov. 2002; 26 pages.
Compucable Web Site Detailing Fire POD System, USB Cable and Firewire Cable; Aug. 22, 2002; 22 pages.
Comarco ChargeSource Power Adapter Systems (Including Tips); 2000; 56 pages.
Mobility Juice Power Adapter System (Including Tips); Jan. 2003; 36 pages.
USPTO; Final Office Action dated Nov. 8, 2007 in U.S. Appl. No. 11/642,273.
USPTO; Office Action dated Jun. 4, 2007 in U.S. Appl. No. 11/642,273.
USPTO; Notice of Allowance dated Jan. 21, 2010 in U.S. Appl. No. 11/642,273.
USPTO; Office Action dated Apr. 14, 2008 in U.S. Appl. No. 11/642,273.
USPTO; Office Action dated Mar. 1, 2007 in U.S. Appl. No. 11/642,273.
EP; Examination report dated Jun. 17, 2010 in Application No. 07 008 300.1.
CA; Office Action dated Nov. 2, 2006 in Application No. 2,475,060.
CA; Office Action dated Mar. 25, 2008 in Application No. 2,475,060.
CA; Office Action dated Dec. 10, 2008 in Application No. 2,475,060.
IL; Office Action dated Mar. 12, 2009 in Application No. 163615.
PCT; International Preliminary Examination Report dated May 19, 2006 in Application No. PCT/US20041016292.
PCT; International Search Report and Written Opinion dated Nov. 2, 2004 in Application No. PCT/US2004/016292.
CN; Office Action dated May 25, 2007 in Application No. 200480000039.8.
SG; Written Opinion dated Jul. 20, 2006 in Application No. SG 200406051-3.
SG; Examination Report dated Mar. 23, 2007 in Application No. SG 200406051-3.

* cited by examiner

CONNECTOR SHAPED AS A FUNCTION OF ITS POWER RATING

CROSS-REFERENCE TO RELATED APPLICATIONS

This application is a Continuation of U.S. patent application Ser. No. 11/642,273 entitled "POWER CONVERTER HAVING POWER RATING FOR PORTABLE ELECTRONIC DEVICES" filed Dec. 19, 2006, which is a Continuation of U.S. patent application Ser. No. 10/790,877 entitled "Keyed Universal Power Tip and Power Source Connectors" filed Mar. 2, 2004, now issued as U.S. Pat. No. 6,976,885.

FIELD OF INVENTION

The present invention is generally related to electrical connectors, and more particularly to electrical connectors suitable for use with portable electronic devices having varying power requirements, including laptop computers, PDA's, mobile phones, MP3 players, digital cameras, and portable DVD players.

BACKGROUND OF THE INVENTION

In the consumer electronics market there are categories of portable electronic devices ranging from Cellular Telephones, to Personal Digital Assistants (PDA's), to Smart Phones, to Digital Cameras, to Portable DVD Players. Each device has specific power requirements from its' internal battery, or to be powered and/or charge this battery from an external power source, such as an AC wall receptacle or a DC power source.

Universal power converters are now available in the market, including those offered by Mobility Electronics Inc. of Scottsdale Ariz., the Applicant of the present invention. Interchangeable device tips are provided, these tips being compatible with different portable electronic devices, and are adapted to receive power from a common power converter.

Since the power requirement can vary greatly for each device, it is desirable in the universal power supply market to have a methodology of categorizing the power requirements into a series of power supplies. Each power supply can service the specific power range of the electronic device which is targeted.

SUMMARY OF THE INVENTION

The present invention achieves technical advantages as an electrical connector, a set of connectors, and a connector' system whereby device connectors are backward compatible with power source connectors such that the device connectors can only be coupled to a power source connector rated at or above the power rating of the power source connector. For instance, a 35 Watt rated device connector can only be coupled with a power source connector rated at 35 Watts and above. Similarly, a 15 Watt device connector can only be coupled to power source connectors rated at 15 Watts and above. The portable electronic device to be powered from drawing power in excess of the power source connector and associated cabling.

In one preferred embodiment, a set of device connectors are provided having conductors terminating at a device connector interface, this interface having a peripheral contoured body portion having a profile being a function of the device connector power rating. A mating power source connector, which may include a cable providing power thereto, has an interface also having a peripheral contoured body portion having a profile being a function of the power source connector power rating. Advantageously, the peripheral contoured body portions of these connectors are configured to mate with each other only when the power rating of the device connector meets or exceeds the power rating of the power source connector. The peripheral contoured body portions are preferable configured as a plug and socket arrangement, each socket having a predetermined power rating can only receive a plug having a compatible power rating.

In an exemplary embodiment, a power connection system comprises a first connector and a second connector. The first connector has a corresponding power rating and a first interface having a first shaped body that is adapted to couple to a power source connector. The second connector comprising a second interface adapted to couple to the power source connector, wherein the second interface has a second shaped body and a second power rating; wherein the first shaped body and the second shaped body are shaped as a function of the first power rating and the second power rating.

In an exemplary embodiment, a power connection system comprises a plurality of power connectors, such that each of the plurality of power connectors comprises a unique interface adapted to couple to a power source. Moreover, each of the unique interfaces has a shaped body that is shaped as a function of a power rating.

In an exemplary embodiment, a power connection system, comprises a first plug and a second plug. The first plug has a first power rating and a first interface with a first shaped body that is adapted to couple to a power source socket. The second plug has a power rating and a second interface with a second shaped body adapted to couple to the power source socket. The first shaped body and the second shaped body are shaped as a function of the first power rating and the second power rating.

Advantageously, the power supplies can be developed for a specific power range, wherein device connectors mate to target portable electronic devices and to power source connectors and cables meeting or exceeding the power rating of these target portable electronic devices.

DETAILED DESCRIPTION

Figure 1:
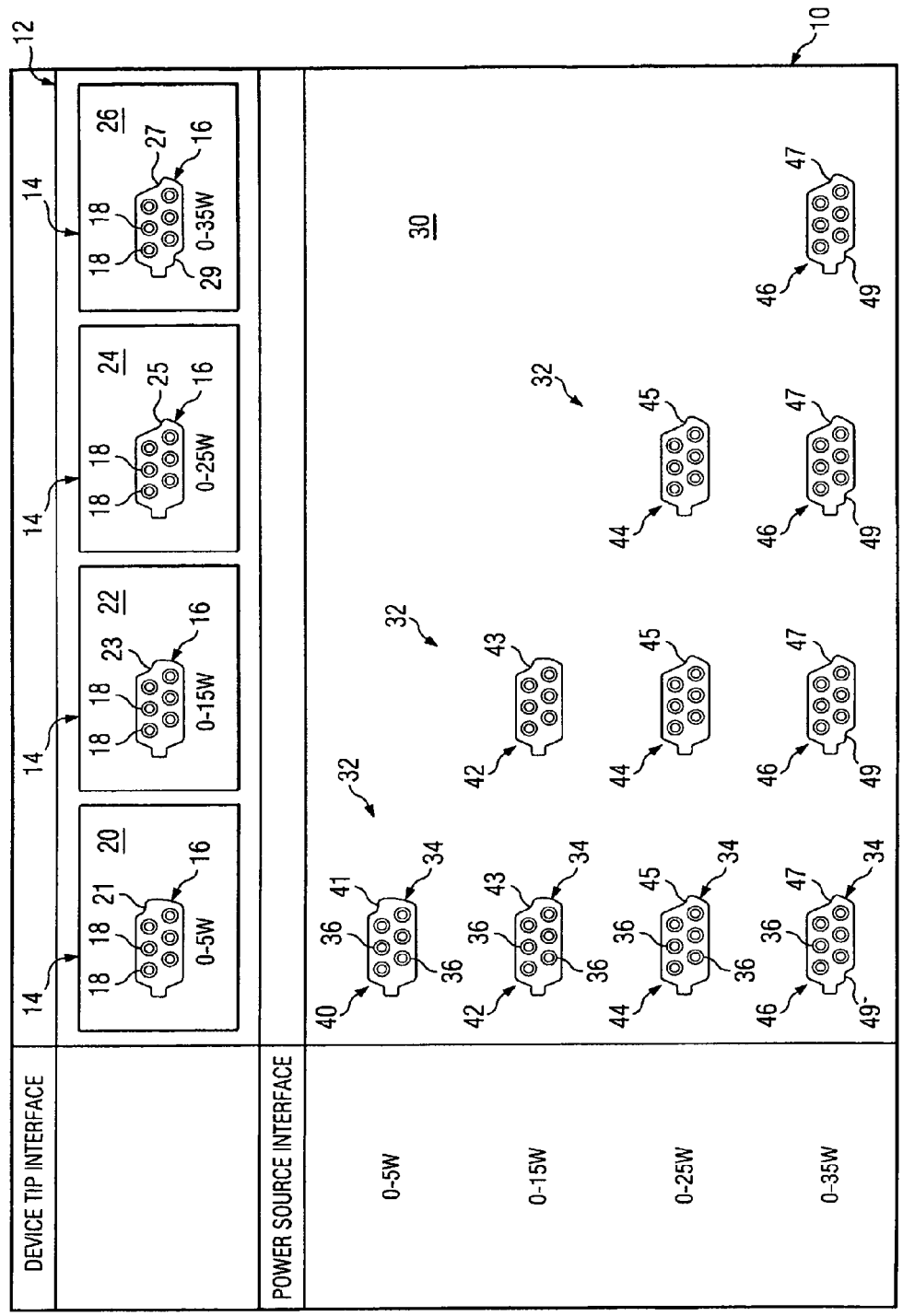
FIG. 1 depicts a set of device connectors and power source connectors each keyed to provide backward compatibility of the power source connectors with the device connectors.

Referring now to FIG. 1, there is generally shown at Keyed connector system 10 comprising a set of device connectors generally shown at 12 and a set of power source connectors generally shown at 30. By way of example, but without limitation to this preferred embodiment, the device connectors are shown to have a connector interface configured as a receptacle, and the power source connectors are configured as plugs. Of course, one skilled in the art will appreciate that the device connector interfaces could comprise of plugs, and the power source connectors could comprise of receptacles if desired.

As shown in FIG. 1, the set of device connectors 12 is seen to comprise separate and distinct device connectors 14 each having a peripheral contoured body portion 16 encompassing the terminating ends of a plurality of electrical conductors, shown as male pins 18. Four (4) different device connectors are shown at 20, 22, 24 and 26, having respective power ratings of 0-5 Watts, 0-15 Watts, 0-25 Watts, and 0-35 Watts. Each device connector also has a target device connector adapted to mate with target portable electronic devices.

Similarly, the set of power source connectors 30 comprise individual power source connectors 32 each having a peripheral contoured body portion 34 encompassing a respective terminating end of plurality of electrical conductors, shown as female pins 36. In a preferred embodiment, the individual power source connectors 32 are shown as connectors 40, 42, 44, and 46, and having respective power ratings of 0-5 Watts, 0-15 Watts, 0-25 Watts, and 0-35 Watts. As visually depicted in FIG. 1, the 0-5 Watt rated power source connector 40 comprises a plug adapted to be received in only 0-5 Watt rated device connector 20, wherein the peripheral contoured body profile 16 of receptacle 20 is adapted to receive the peripheral contoured body profile 34 of plug 40. The 0-15 Watt rated power source connector 42, however, has a body profile 34 adapted to be received in both of receptacle connectors 20 and 22 since the power connector 42 is at least as great as the device connector power rating, and thus, can safely be mated with device connectors 20 and 22.

Likewise, power source connector 44 is rated at 25 Watts, and thus, has a body profile 34 adapted to be coupled to and received within receptacle 20, 22 and 24. Since power source connector 44 is rated at 25 Watts, the device connectors 14 rated at 25 Watts and below, namely, connectors 20, 22 and 24, are adapted to receive and be safely electrically coupled to power source connector 44.

The highest power rated power source connector depicted in this embodiment is power source connector 46, which has a body profile contour 34 adapted to be received within each of the device connectors 20, 22, 24 and 26 as each of these device connectors are rated at 35 Watts or below, which is at or below the power rating of the power source connector 46.

Still referring to FIG. 1, there is shown that the device connector peripheral contoured body portions 16 are all keyed along the right side thereof, with 5 Watt rated device connector 20 having the largest keyed opening defined by key portion 41 configured as a lobe along the right side thereof such that it can receive all the power source connecters 40, 42, 44 and 46, as will be shown in more detail shortly.

Looking at 0-15 Watt rated device connector 22, for instance, it can be appreciated that the key portion 23 of the body profile 16 is lower than key portion 21 of device connector 20. This key portion 23 is mechanically configured to receive corresponding key portion 42 of connector 43, key portion 45 of connector 44, and key portion 47 of connector 46, but is not adapted to receive the key portion 41 of connector 40 since power source connector 43 is rated lower than the device connector 22.

It can be further appreciated that an additional peripheral contoured body key portion of device connector 26 is shown at 29 for the 35 Watt rated device connector 26. Likewise, a second peripheral contoured body key portion 49 of profile 34 is provided for the 35 Watt rated power source connector 46. The 35 Watt device connector 26 and power source connector 46 have these additional keyed portions 29 and 49 to ensure that the 35 Watt device connector 26 can only mate to the 35 Watt rated power source connector 46.

Figure 2:
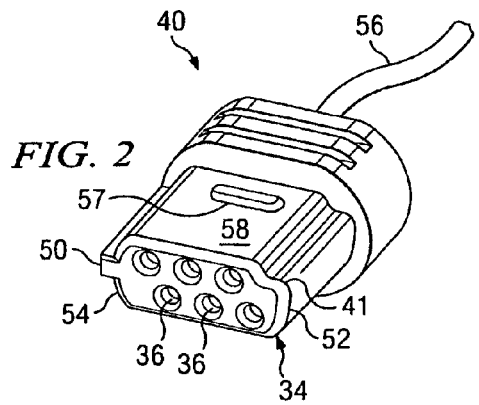
FIG. 2 is a perspective view of a 0-5 Watt rated power source connector keyed such that only device connectors rated at 5 Watts and below are adapted to electrically and physically connect thereto.
Figure 3:
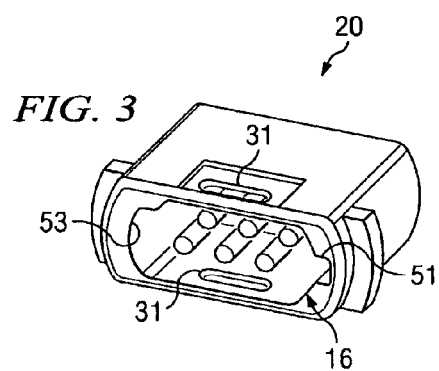
FIG. 3 is a perspective view of a 0-5 Watt rated device connector adapted to receive only a power source connector rated at 5 Watts and above.

Referring now to FIG. 2, there is shown a perspective view of the 5 Watt rated device connector 40 configured as a plug. The peripheral contoured body portion 34 includes the body key portion 41 and an alignment tab 50 providing the keying so as to only be connectable to device connector 20, as previously described. Power source connector 40 is further seen to include a cable portion 56 including a plurality of connectors, each connector coupled to and terminating at one of the female interface pins 36 adapted to receive power from a power source, such as a power converter (not shown). An elongated projection 57, shown as a tab, extending laterally across an upper portion of the connector body 58 is adapted to be releasingly secured within one of the device connectors, such as device connector 20, whereby a corresponding body slot 31 flexibly receives the upwardly corresponding projection 57. A similar projection tab 57 extends from the opposing surface of body 58 (not shown) which is releasingly securable within the opposing slot 31 shown in FIG. 3.

The peripheral contoured body portion 16 of device connector 20 has a slot 51 adapted to securingly receive the corresponding tab 50 of the power source connector received therein, and also a keyed portion 53 adapted to receive all of the power source connectors having a power rating greater than the 5 Watt power rating of device connector 20.

Figure 4:
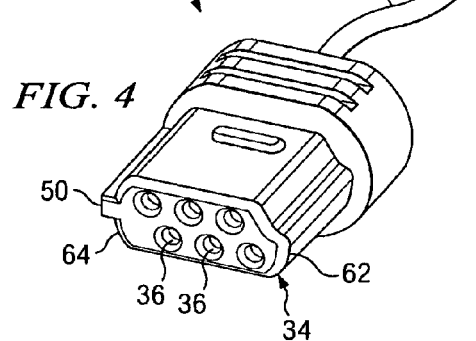
FIG. 4 is a perspective view of a 0-15 Watt rated power source connector keyed to be received in device connectors rated at 15 Watts and below.

Referring to FIG. 4, there is shown a perspective view of the power source connector 42 having a power rating of 0-15 Watts, having a keyed portion 62 and 64 configured to be received in only 5 Watt rated device connector 20 and 15 Watt rated connector 22.

Figure 5:
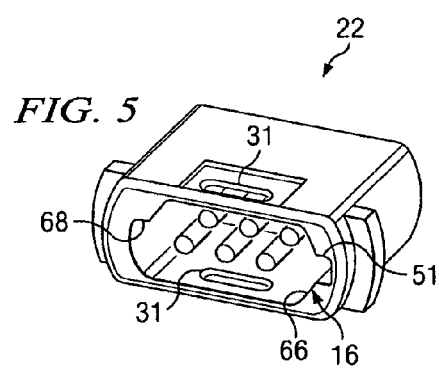
FIG. 5 is a perspective view of a 0-15 Watt rated device connector keyed to receive power source connectors rated at 15 Watt's and above.

FIG. 5 shows a perspective view of the device connector 22 having a contoured peripheral body portion 16 including a keyed portion 66 and 68.

Figure 6:
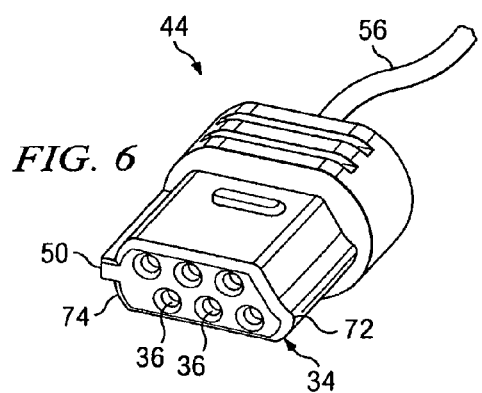
FIG. 6 is a perspective view of a 0-25 Watt rated power source connector keyed to be received in device connectors rated at 25 Watts and below.

Referring now to FIG. 6, there is shown a perspective view of the 0-25 Watt power source connector 44 whereby the peripheral contoured body portion 34 has a keyed portion 72 and 74. This power source connector can only be received in device connectors 20, 22 and 24.

Figure 7:
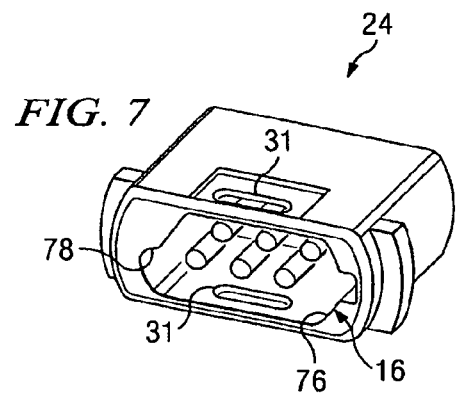
FIG. 7 is a perspective view of a 0-25 Watt rated device connector keyed to receive only power source connectors rated at 25 Watts and above.

Referring to FIG. 7, there is shown a peripheral view of the 0-25 Watt rated device connector 24, whereby the peripheral contoured body portion 16 has a keyed portion 76 and 78. The 0-25 Watt rated device connector 24 is adapted to couple to only the power source connectors having a rating of at least 25 Watts, namely, the 0-25 Watt rated power source connector 44 and the 0-35 Watt power source connector 46.

Figure 8:
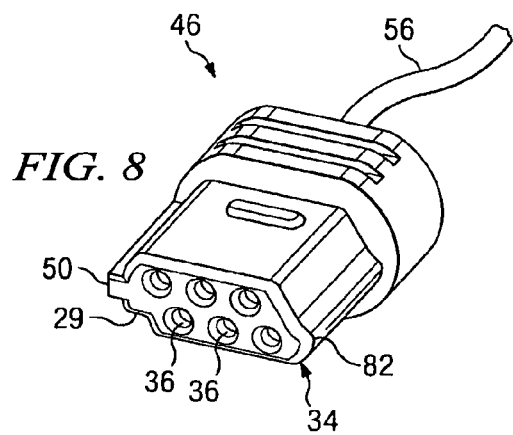
FIG. 8 is a perspective view of a 0-35 Watt rated power source connector keyed to be received in device connectors rated at 35 Watts and below.

Referring now to FIG. 8, there is shown a perspective view of the 0-35 Watt rated device connector 46, whereby the peripheral contoured body portion 34 has a keyed portion 82 and 84.

Figure 9:
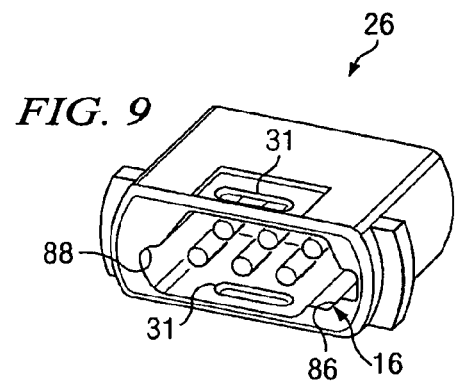
FIG. 9 is a perspective view of a 0-35 Watt rated device connector keyed to receive power source connectors rated at 35 Watts and above.

Referring to FIG. 9, there is shown a perspective view of the 0-35 Watt device connector 26, whereby the peripheral contoured body portion 16 has a keyed portion 86 and 88. This 35 Watt rated device connector 26 is adapted only receive within the 0-35 Watt power source connector 46, as connector 46 is rated to provide at least 35 Watts of power.

Advantageously, each of the power source connectors 40, 42, 44 and 46 are backward compatible such that the power source connectors 32 can only be received within device connectors 14 having a power rating no greater than a connecting power source connector. Advantageously, a target portable electronic device having a power rating, for example, of 25 Watts can only be connectable to a power source connector rated at least as high as 25 Watts so as to not draw more power than the rating of the power source connector 32.

Figure 10:
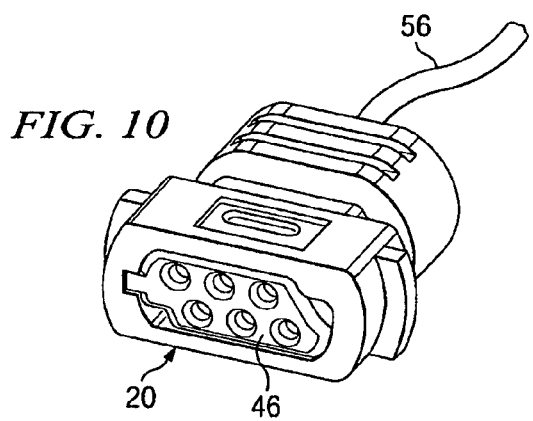
FIG. 10 is a perspective cutaway view of the 0-5 Watt rated device connector securingly receiving the 35 Watt rated power source connector, illustrating a lower power rated device connector engaging a higher power rated source connector.

Referring now to FIG. 10, there is shown one example of the 0-5 Watt rated device connector 20 receiving a 35 Watt power rated source connector 46. The respective keying of device connector 20 and power source connector 46 are shown to not provide an interference fit, and thus allow the secure reception of plug 46 into receptacle 20.

Figure 11:
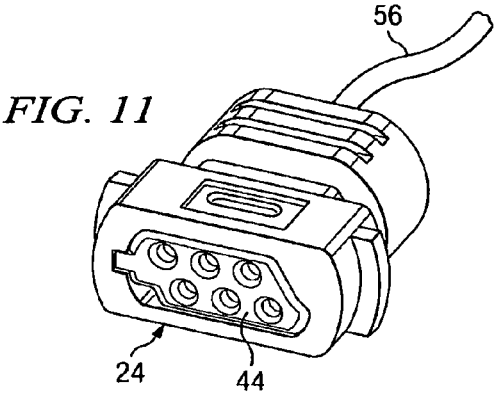
FIG. 11 is a perspective cutaway view of the 0-25 Watt rated device connector securingly receiving the 35 Watt rated power source connector, illustrating a lower power rated device connector engaging a higher power rated source connector.

Referring to FIG. 11, there is shown an example of the 0-25 Watt rated device connector 24 receiving the 35 Watt power source connector 44. Again, the respective key portions of plug 44 and receptacle 24 do not provide an interference fit, and thus allow the secure connection to each other.

Figure 12:
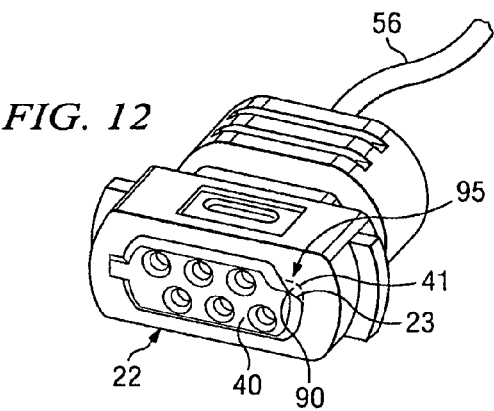
FIG. 12 is a perspective cutaway view of the 0-15 Watt rated device connector theoretically being received within the 5 Watt rated power source connector, which is not possible due to the interference of the power source connector key portion 41 with the device connector key portion 23.

Referring now to FIG. 12, there is shown an illustration of the 0-15 Watt rated device connector 22 physically interfering with a 5 Watt rated power source connector 40, the interference being shown at 90. This, illustration shows the interference of key portion 41 of power source connector 40 with the key portion 23 of device connector 22. Because of this interference, these two connectors can not mate, which advantageously ensures that a higher power rated device connector 14 can never be connected to a lower power rated power source connector 32.

Figure 13:
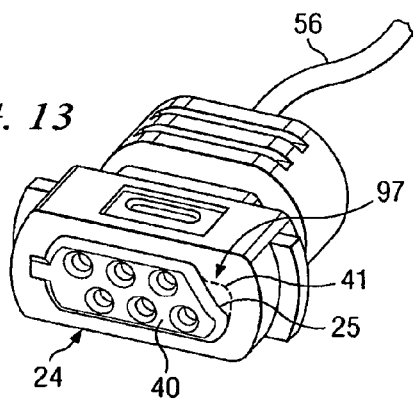
FIG. 13 is a perspective cutaway view of the 0-25 Watt rated device connector theoretically receiving a 5 Watt rated power connector, which is not possible due to the interference of the power source connector key portion 41 with the device connector key portion 25.

Referring to FIG. 13, there is shown yet another illustrating whereby the 0-25 Watt rated device connector 24 would have an interference with the 5 Watt rated power connector 40. Specifically, key portion 41 of power source connector 40 can not be received within the 25 Watt rated device connector 24 because device connector key portion 25 interferes with the key portion 41 of power source connector 40, as shown.

Figure 14:
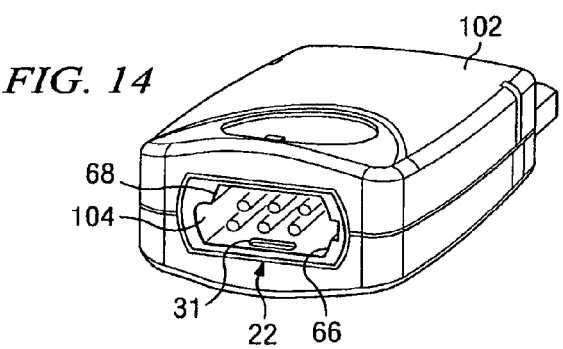
FIG. 14 is a perspective view of one embodiment of a device connector fully assembled in a housing.

Referring now to FIG. 14, there is shown at 100 a tip connector including the 0-15 watt device connector 22 (see FIG. 5) packaged in a housing 102, and a portable electronic device connector 110. The plurality of pins 18 are shown protruding from a socket 104 encompassed by the contoured peripheral body portion 16 including keyed portions 66 and 68.

Figure 15:
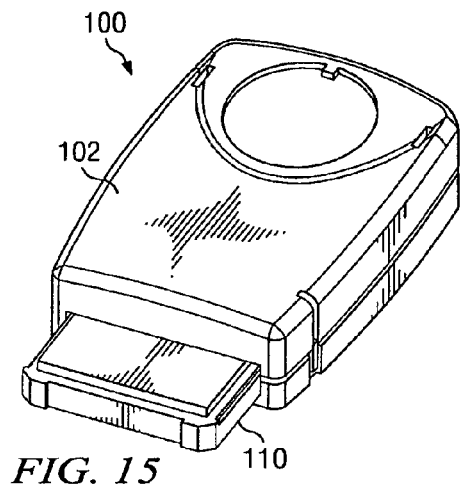
FIG. 15 is an end perspective view of the connector of FIG. 14.

Referring now to FIG. 15, there is shown a perspective rearview of tip connector 100 depicting connector 110 adapted to connect to a portable electronic device to be powered. The shape and/or pin-out of each tip connector 100 will vary from device to device, depending on the interface requirement of such portable electronic device to be powered, and the power rating of the tip connector 100.

Figure 16:
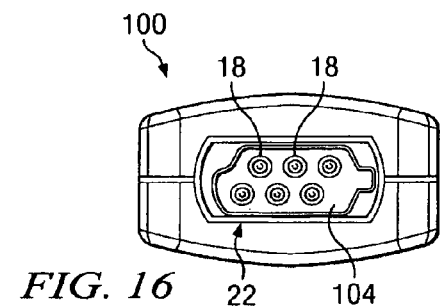
FIG. 16 is an end view of the device connector and of connector 100.

FIG. 16 shows an end view of tip connector 100 further depicting the profile of the socket 104, which as previously described, is adapted to receive the power source connector having, in this embodiment, a power rating of 15 watts and above.

Figure 17:
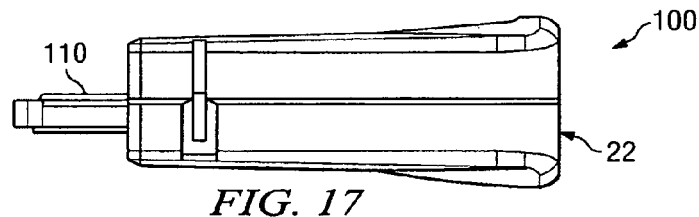
FIG. 17 is a side elevational view of the connector of FIG. 14.
Figure 18:
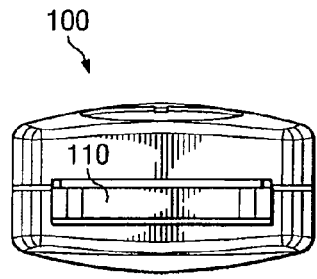
FIG. 18 is an end view of the connector of FIG. 14 illustrating the portable electronic device connector.
Figure 19:
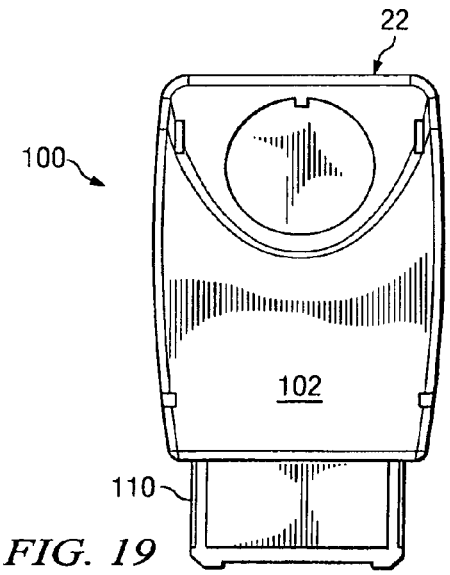
FIG. 19 is a top view of the connector of FIG. 14.
Figure 20:
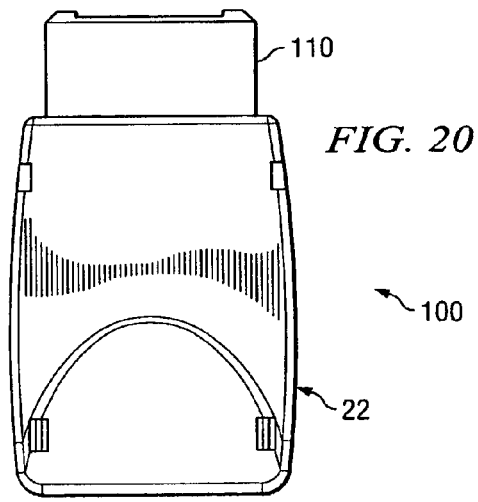
FIG. 20 is a bottom view of the connector of FIG. 14.

FIG. 17 shows a side elevational view of tip connector 100. FIG. 18 shows an end view of connector 100 viewing the connector 110. FIG. 19 is a top view of connector 100, and FIG. 20 is a bottom view of connector 100.

Figure 21:
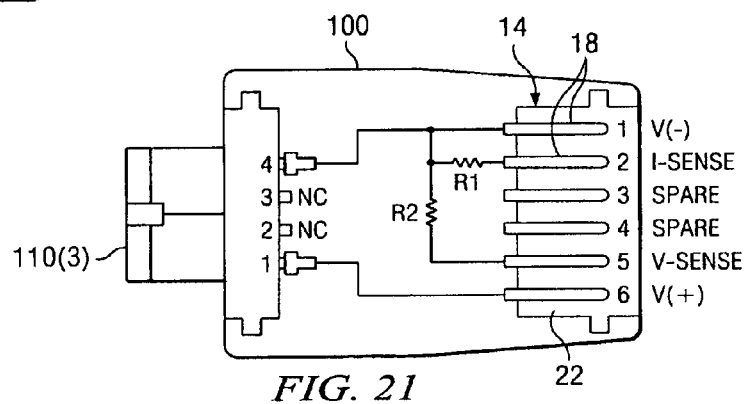
FIG. 21 is an electrical schematic of one embodiment of the connector shown in FIG. 14 illustrating the p-out of the device connector 14 and the portable electronic device connector 110, along with design parameters for one embodiment of the present invention.

Referring now to FIG. 21, there is shown an electrical schematic diagram of one embodiment of tip connector 100, showing one possible pin-out assignment for each of the pins 18 and the pins of portable electronic device connector 110. As shown in FIG. 21, a resistive device network is established between pins 1, 2 and 5 of connector 14 comprising resistors R1 and R2. The values of the resistors R1 and R2 are selected to provide a desired output voltage and desired output current. Shown in this embodiment is an associated parts list, configured such that the output voltage is shown to be 5.21 volts +/−2.5%, output current 0.49 amps +/−5%, whereby resistors R1 and R2 are 1% 1/16 watt resistors, such that tip connector 100 is configured as a 8 watt power rated connector. Of course, for connectors adapted to power different portable electronic devices, the particular pin-out of connector 110 may vary, and the component values and design parameters are configured to meet the particular requirements of such intended portable electronic device to be powered.

Figure 22:
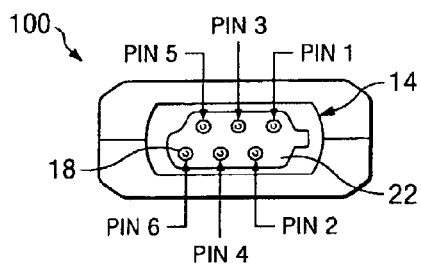
FIG. 22 is an end view of the pin-out of the connector shown in FIG. 21.
Figure 23:
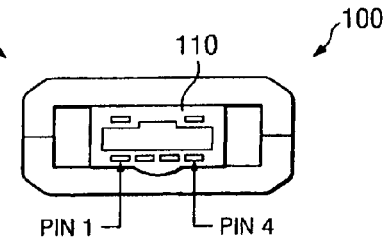
FIG. 23 is an end view of the connector of 21 showing the p-out of the portable electronic device connector.

Referring to FIG. 22, there is shown an end view of device connector 14 of the tip connector 100 shown in FIG. 21, and FIG. 23 depicts the end view of portable electronic device connector 110 in the embodiment shown in FIG. 21, showing the pin-outs of pins 1-4.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A power connection system comprising:
   a first connector comprising a first interface adapted to individually couple to a power source connector, wherein the first interface has a first shaped body and a first power rating; and
   a second connector comprising a second interface adapted to individually couple to the power source connector, wherein the second interface has a second shaped body and a second power rating;
   wherein the first shaped body is shaped as a function of the first power rating and the second shaped body is shaped as a function of the second power rating.

2. The power connection system of claim 1, wherein the first connector further comprises a first device connector, and wherein the second connector further comprises a second device connector.

3. The power connection system of claim 1, wherein the first power rating is different than the second power rating.

4. The power connection system of claim 1, wherein the first shaped body has a peripheral contour.

5. The power connection system of claim 1, wherein the first connector is backwards compatible with the second connector.

6. The power connection system of claim 1, wherein the first connector and the second connectors are plugs.

7. The power connection system of claim 1, wherein the power source connector is a socket.

8. The power connection system of claim 1, wherein the power source is configured to receive at least one of an AC input and a DC input.

9. A power connection system comprising:
   a plurality of device connectors, each of the plurality of device connectors comprising a unique interface such that each unique interface is adapted to individually couple to a power source connector, wherein each one of the unique interfaces has a shaped body; and
   wherein the shaped bodies of each of the unique interfaces is shaped as a function of a power rating.

10. The power connection system of claim 9, wherein the power source connector is configured to provide power to a plurality of electronic devices.

11. The power connection system of claim 9, wherein each of the plurality of device connectors is configured to provide a predetermined amount of power.

12. The connection system of claim 9, wherein each of the plurality of power device connectors comprises a unique device connector.

13. The power connection system of claim 12, wherein the unique device connector comprises an electrical component establishing a device connector power rating.

14. The power connection system of claim 13, wherein the electrical component comprises a resistor.

15. A power connection system, comprising:
    a first plug comprising a first interface adapted to individually couple to a power source socket, wherein the first interface has a first shaped body and a first power rating; and
    a second plug comprising a second interface adapted to individually couple to the power source socket, wherein the second interface has a second shaped body and a second power rating;
    wherein the first shaped body is shaped as a function of the first power rating and the second shaped body is shaped as a function of the second power rating.

* * * * *